United States Patent
Leveridge et al.

[19]

[11] Patent Number: 5,904,328

[45] Date of Patent: May 18, 1999

[54] ARTICULATING COMPUTER MONITOR

[75] Inventors: Philip Leveridge; Robert Garrett, both of Austin; Carrie Bader, Georgetown; Blake West; Larry Barbera, both of Austin, all of Tex.

[73] Assignee: STB Systems, Inc., Richardson, Tex.

[21] Appl. No.: 08/880,272

[22] Filed: Jun. 23, 1997

[51] Int. Cl.⁶ ................................................. A47G 29/00
[52] U.S. Cl. .................................... 248/124.1; 248/285.1; 248/919; 248/922
[58] Field of Search ................................ 248/121, 122.1, 248/124.1, 124.2, 125.1, 278.1, 279.1, 295.11, 297.21, 225.11, 917, 919, 920, 921, 922, 923

[56] References Cited

U.S. PATENT DOCUMENTS

| | | | |
|---|---|---|---|
| 2,110,764 | 3/1938 | Graves | 248/124.2 X |
| 2,569,622 | 10/1951 | Trainor | 248/297.21 X |
| 3,399,856 | 9/1968 | Pecaut | 248/279.1 |
| 4,170,336 | 10/1979 | Malis | 248/279.1 |
| 4,395,010 | 7/1983 | Helgeland et al. | 248/920 X |
| 4,516,751 | 5/1985 | Westbrook | 248/920 X |
| 4,690,362 | 9/1987 | Helgeland | 248/920 X |
| 4,944,481 | 7/1990 | Yurchenko et al. | 248/923 X |
| 5,687,939 | 11/1997 | Moscovitch | 248/921 X |

*Primary Examiner*—Derek J. Berger
*Attorney, Agent, or Firm*—Locke Liddell & Sapp, LLP

[57] ABSTRACT

An articulating computer monitor apparatus has a base with a vertical stand and a support block which is infinitely adjustable over a range of vertical positions. A pair of cantilevered arms are pivotally attached to a support block attached to the upright stand. The cantilevered arms have an attachment end which are located close together which avoids creating a large gap between dual monitors mounted on the arms. The arms have an offset support section with pivotable clutch-hinges which are attached to flat panel monitors. The apparatus provides dual monitors which may be raised and lowered, pivoted toward each other or away and tilted backward and forward so that the user has the ability to move the monitors in three directions to create glare-free efficient viewing. Two of the assemblies can be used on a desktop to create a "stadium" effect.

17 Claims, 6 Drawing Sheets

ARTICULATING COMPUTER MONITOR

BACKGROUND OF THE INVENTION

1. Field of the Invention

The invention relates to an assembly for supporting computer monitors which adjusts vertically, pivots and tilts forward and back.

2. Background of the Art

Flat panel monitors for computer systems are known in the art. They are considered the expensive promised land for desktop computers which can now be produced at a reasonable price although they are still considerably more expensive than traditional large desktop monitors. The obvious advantage is a drastic reduction in space requirements, where space is often critical. In addition, they are much lighter and smaller for shipment or moving, have virtually no radioactive emissions, generate less heat and have less flicker which is associated with traditional monitors using CRTs. However, supporting assemblies for flat panel monitors are often rudimentary. One known system has a plurality of linerally aligned link segments which are linked at each end at a zig zag pattern which allow the monitor to be moved in or out and raised and lowered like a desk lamp. Pedestal systems are known which have a supporting stem with a single tilting adjustment. Side to side movement is accomplished by rotating the entire pedestal. In addition, it does not appear that the art has developed an assembly for multiple monitors, although obviously stand alone units could be positioned side by side.

SUMMARY OF THE INVENTION

The invention is an articulating computer monitor assembly which provides for multiple monitors on a single stand wherein the monitors can be raised and lowered, pivoted forward and back, and tilted forward and back.

The articulating computer monitor apparatus has a base designed to rest on a horizontal surface which supports an upright stand. The base has a portion extending behind the upright stand and spaced apart legs extending forwardly from the stand, creating a space in front which will accept a computer keyboard. The base has a foot under and behind the post and foot pads at the front of the arms which provide three contact points to provide stability if the base is placed on an uneven surface. The base supports an upright stand in a vertical position. The base has an opening shaped like the stand which provides support. The stand may be secured by fasteners from underneath so that the stand is securely fixed to the base. The stand is preferably a hollow metal extrusion having opposed front and back surfaces connected by spaced apart transverse webs which define shoulders on opposite sides which are exposed by means of a window in each of the front and back surfaces.

A support block is securable over a range of vertical movement at selected positions along the stand and fits in the window. The shoulders receive and support the support block on one side and a cap for the support block on the other side. The support block has two separated arms having posts which extend forwardly away from the stand. At least one cantilevered arm is pivotally coupled to the support block posts by a pivotable coupling which is mounted on the inside surface of a structural half section of the arms at an attachment end. The wall of the cantilevered arm has openings which receive a pair of vertically spaced posts extending from each arm of the support block which are connected to the pivotable coupling. A cover half section of the arm meets with and covers the main part of the structural half section and hides the connecting parts. Each cantilevered arm has an offset support structure extending away from the arm which is offset behind the arm and rises upwardly from the support half of the arm. Each of the offset support structures have one or more pivotable hinged connections which pivot along a horizontal pivot axis. The pivotable hinged connections are used for attachment to a structural portion of a computer monitor and permits the monitor to be tilted backward and forward with respect to the stand. The offset of this structure and the degree of elevation is designed so that when a computer monitor is mounted thereon, its bottom edge can be generally aligned over the cantilevered arm for a pleasing compact appearance.

The assembly is particularly suited for flat panel monitors for data intensive users. The ability to raise and lower, pivot and tilt the monitors makes it possible for the user to achieve greater efficiency in a smaller space without extraneous distractions. There is preferably a small gap between the monitors so that they can be tilted without interference after each of the cantilevered arms have been pivoted forwardly toward the user. Depending on the support, this gap may be less than the gap between monitors which exists when conventional monitors are placed side by side. The assembly of the present invention permits creation of a "stadium" effect by placing one of the assemblies with two monitors on the left side and another of the assemblies with two monitors on the right side whereby four monitors are available in a confined space. This is particularly useful for brokerage houses and financial institutions. The articulation in three dimensions allows the user to arrange the screens to avoid reflections and glare and in the most efficient manner.

DETAILED DESCRIPTION OF THE PREFERRED EMBODIMENT

Figure 1:
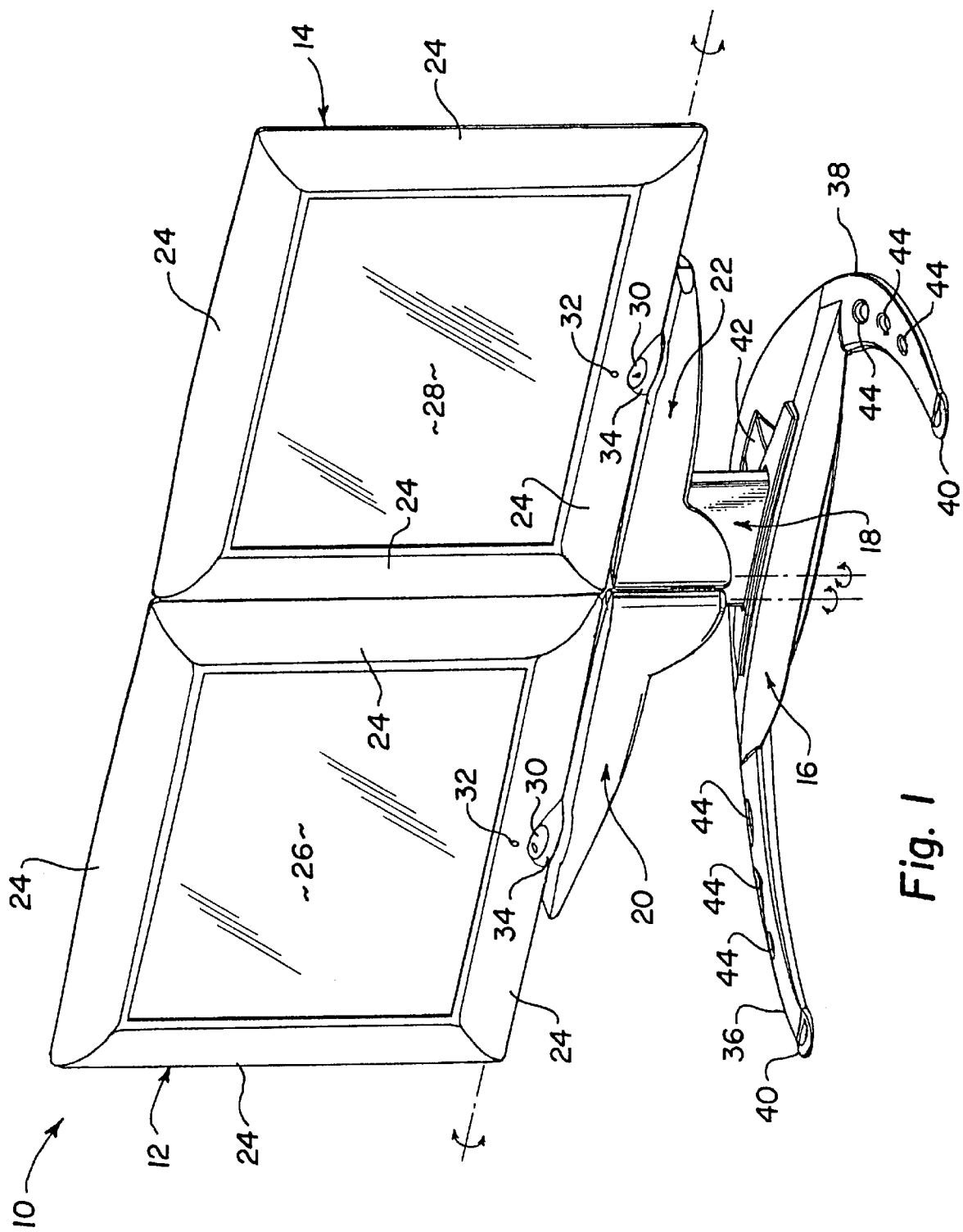
FIG. 1 shows a dual head freestanding embodiment of the invention with two monitors which can be raised, pivoted and tilted by means of articulating arms.

In the description that follows, like parts will be referred to by the same reference numerals. An articulating computer monitor apparatus is referred to generally by the reference numeral 10. The articulating apparatus includes a flat panel monitor 12 on the left and a flat panel monitor 14 on the right. Articulating unit 10 includes a base 16 designed to rest on a horizontal surface such as the top of a computer user's desk. Base 16 supports an upright stand 18. A support block to be described later with reference to FIGS. 4–6, which is hidden in FIG. 1, supports a pair of elongate cantilevered arms 20 on the left and 22 on the right in FIG. 1. Monitor 12 is hingedly connected to arm 20 and monitor 14 is hingedly connected to arm 22 in a manner which permits them to be independently tilted forward and back with respect to a user sitting in front of apparatus 10 as seen in FIG. 1.

Monitors 12, 14 each have a border 24 around the four sides of a screen 26 on monitor 12 and a screen 28 on monitor 14. Screens 26, 28 can display separate data or screen 28 can display a continuation of the data on screen 26 depending upon an electronic set up which is not part of this invention. The close adjacency of the screens and the maintenance of their proximity as cantilevered arms 20, 22 are pivoted facilitates user comprehension no matter what data presentation mode is chosen. Each monitor includes a power switch 30 and appropriate LEDs 32.

Pivoting arms 20, 22 are shown in include a depression to accommodate a bulging portion 34 of the bottom border 24 where the power switching parts are located. The need for this is, of course, dependent upon the particular monitor chosen. Base 16 has a pair of circular shaped arms comprising arm 36 on the left and arm 38 on the right. They are sized and spaced or receive a computer keyboard in the space between them. Arms 36, 38 each have a foot pad 40 at the outer end which keeps the structure from rocking. Best seen in FIG. 4, the back of the base 16 has a larger foot 42 which also contacts the horizontal surface on which the unit rests. The rest of the base is preferably raised relative to the horizontal surface on which it sits so that the weight is supported on foot 42 and foot pads 40. This three point support eliminates rocking if the horizontal surface is not exactly flat. A series of decorative openings 44 may be provided for a decorative effect.

Figure 4:
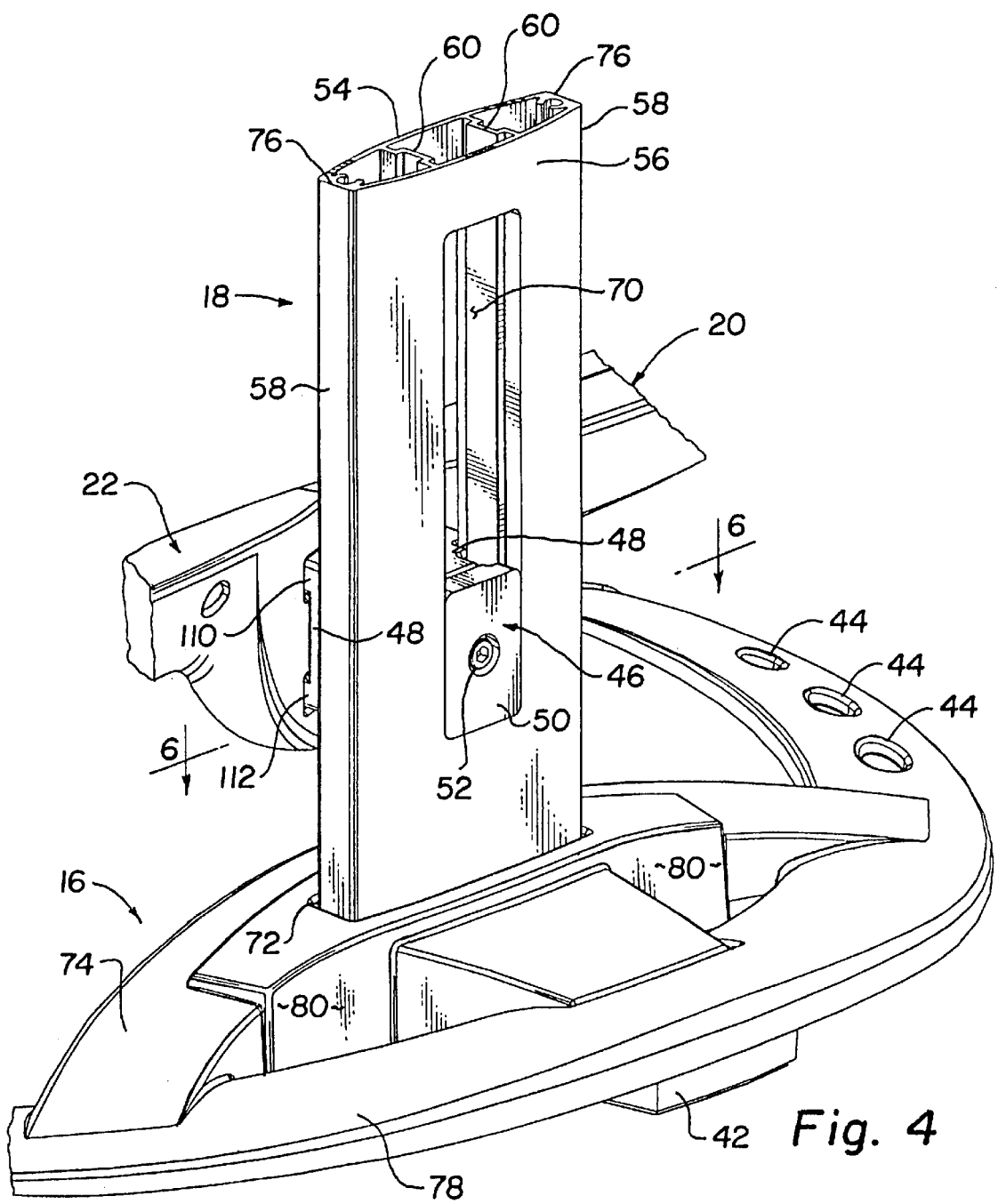
FIG. 4 is a view of the apparatus looking from behind showing the support block as it fits in a window of the upright stand for vertical adjustment of the cantilevered arms.
Figure 5:
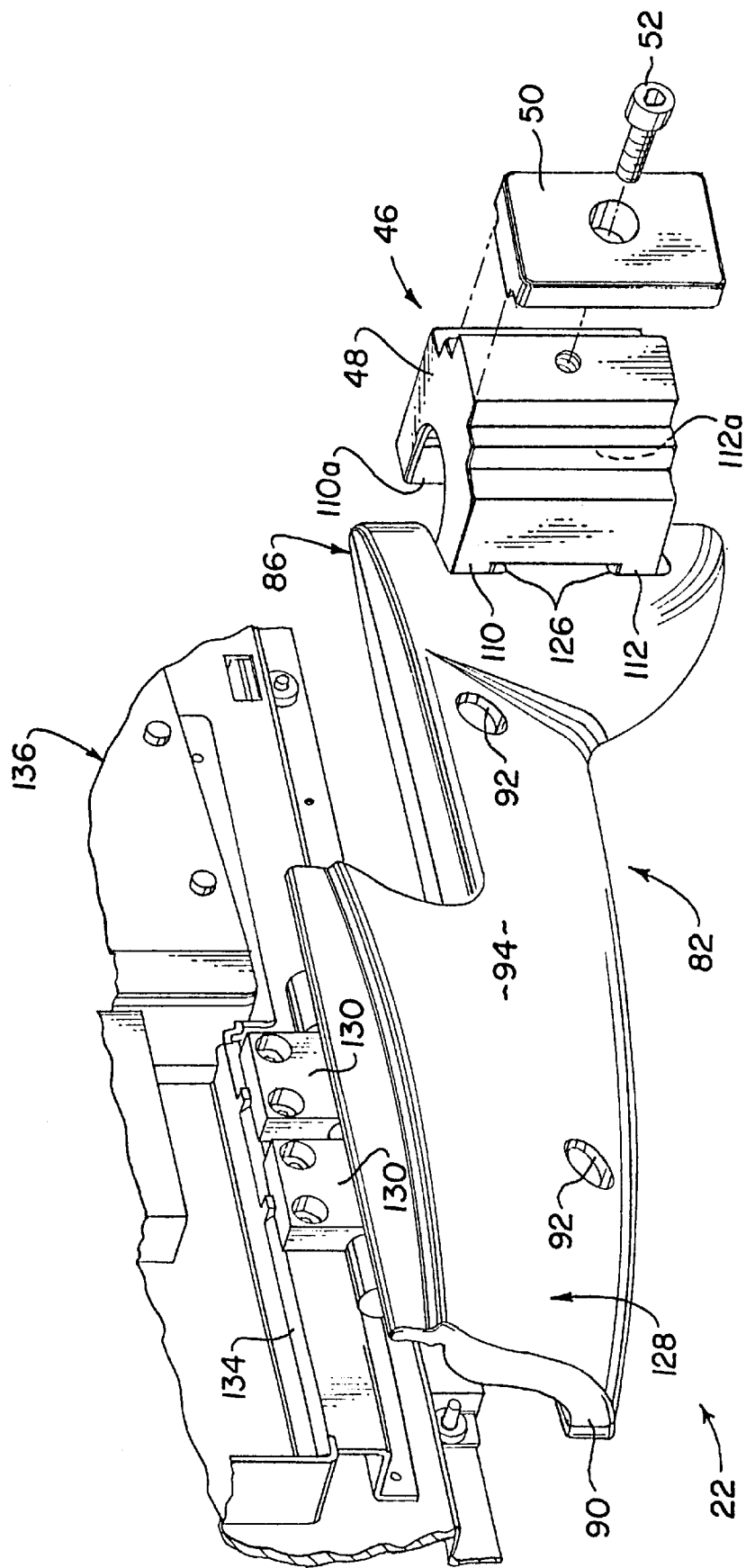
FIG. 5 is a perspective broken away view seen from behind a cantilevered arm attached to the support block with the cap for the support block and a panel from the monitor, seen with the external parts removed, connected to a hinged connection mounted on the arm.
Figure 6:
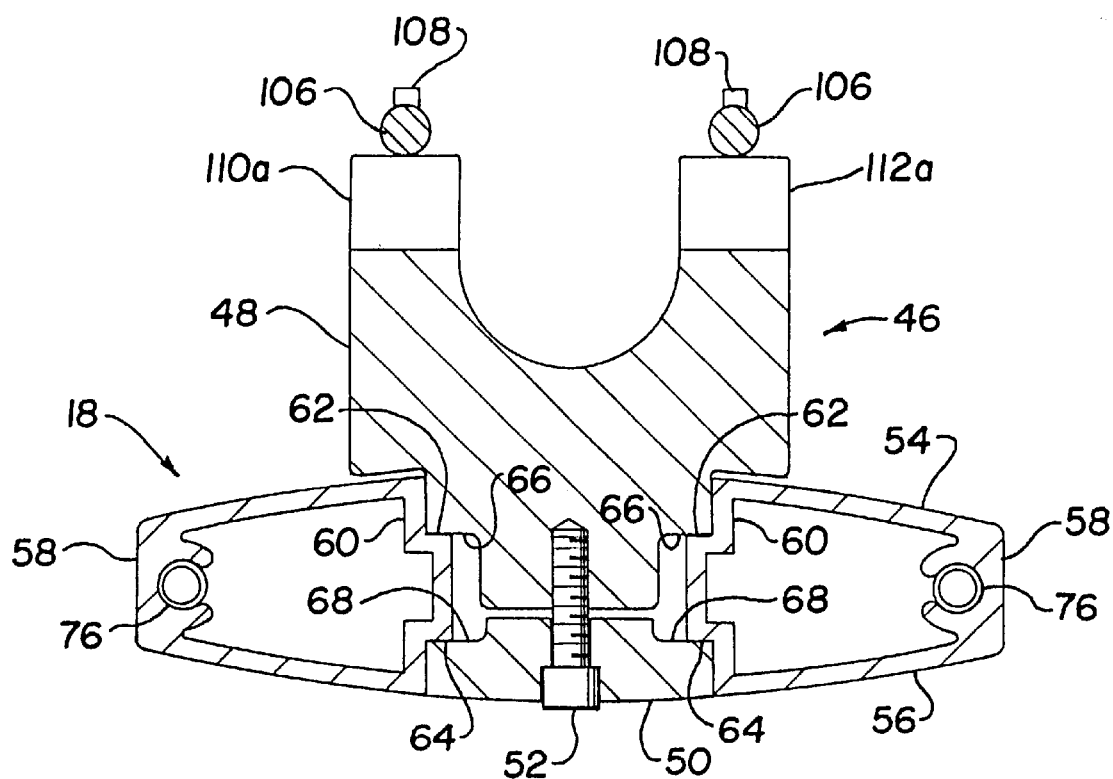
FIG. 6 is a cross-sectional view along the line 6—6 of FIG. 4 showing the cross section of the upright stand, support block and cap seated on shoulders created by spaced apart transverse webs in the stand.

FIGS. 4–6 show how the arms are supported on the upright stand by means of a support block 46. Support block 46 comprises a main block 48 and a support cap 50 which are connected by fastener 52. By reference to FIG. 4 and FIG. 6, upright stand 18 has a front surface 54 and a rear surface 56. Stand 18 is preferably a hollow metal extrusion with the squared off oval shape shown. It is finished off with an end cover 19. Stand 18 has opposite ends 58 wherein the opposed surfaces 54, 56 are connected by spaced apart transverse webs 60 which are offset inwardly to form shoulders 62 facing frontwardly and shoulders 64 facing rearwardly. Main block 48 has shoulder 66 which correspond with shoulder 62 and support cap 50 has shoulder 68 which correspond with shoulder 64 so that when the main block is positioned against shoulder 62 and the support cap is positioned against shoulder 64 and screw 52 is tightened, support block 46 is securely fastened at a selected vertical location within the window 70 in FIG. 4 which is a vertically elongated window created by cutting away surfaces 54 and 56 at the inside edges of webs 60. Although it is not easily seen, a window 70 is made on both sides of upright stand 18.

Thus it may be seen that support block 46 is securable along stand 18 over a range of vertical movement. Base 16 itself holds the lower end of stand 18 supported by the walls surrounding an opening 72 which has the same shape as stand 18. The lower end of stand 18 closely fits in opening 72 where it rests upon the bottom wall of base 16 at the forward end of foot 42. Opening 72 is located in a forwardly curved support section 74. The sides 58 of stand 18 contain formed openings 76 best seen in FIG. 6 which can be reached through drilled openings in the underside of the lower surface of foot 42 whereby the lower end of stand 18 can be securely fixed with fasteners into opening 72 of base 16. Base 16 further includes a rearwardly curved support section 78. In the embodiment shown, a pair of openings 80 are formed between curved sections 74, 78 and the sides of foot 42.

Figure 2:
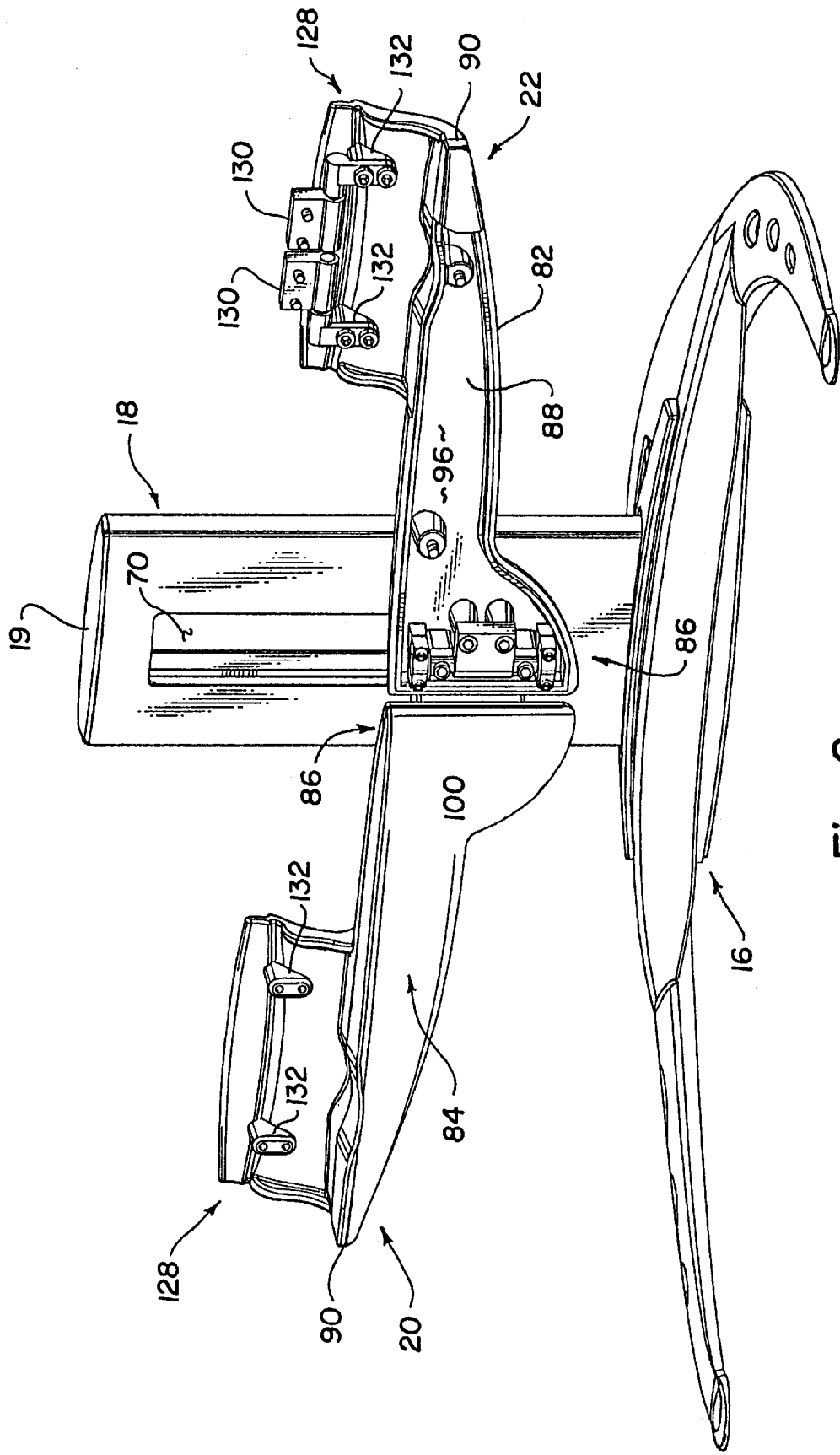
FIG. 2 illustrates the embodiment of FIG. 1 when the monitors are disconnected and a cover half of one arm removed to show pivoting hinge connections at the attachment end of the arm and an extension thereof.
Figure 3:
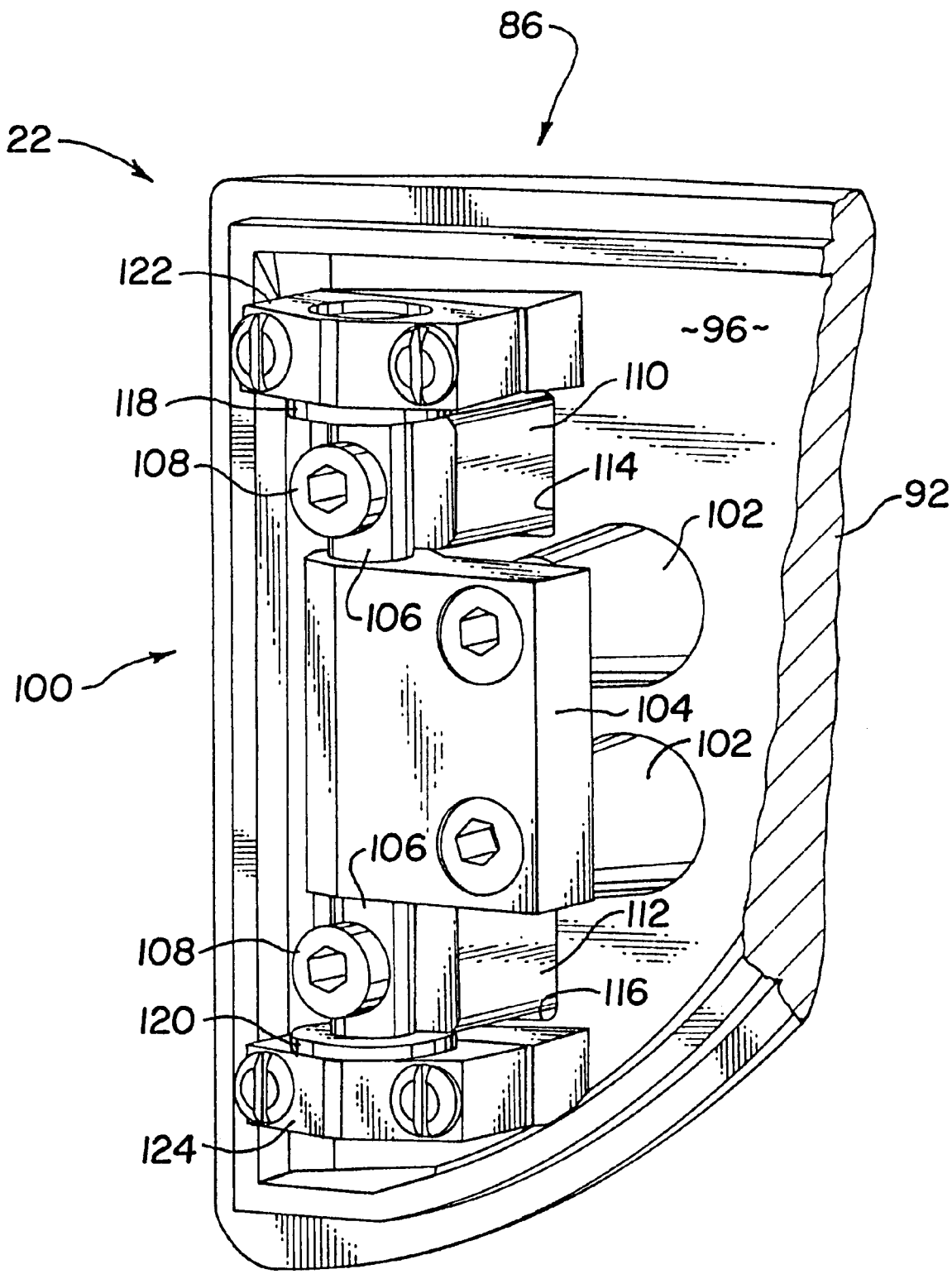
FIG. 3 is an enlarged view of the attachment end of one arm and posts which extend through openings in the wall of the arm to which the shaft of a pivotable coupling is fixedly attached.

The cantilevered arms are essentially mirror images of each other made in left and right hand versions. Each cantilevered arm has a structural section 82 seen in FIG. 5 and the right hand portion of FIG. 2 and a cover section 84 which matches and mates with the main part of structural section 82. In FIG. 2, covered section 84 which is present on the left hand side has been removed on the right hand side. The discussion of the cantilevered arms will be made with reference to the parts themselves regardless of whether the part is a left hand version or a right hand version. Since they are symmetrical and mirror images of each other there is no need to complicate the discussion by assigning different reference numerals to what amounts to the same feature. The discussion will apply equally whether we are referring to cantilevered arm 20 or 22. Each arm has an attachment end 86 an outer end portion 88 and an outer end 90. Cantilevered arms 20, 22 comprise a wall 92 which is indicated in FIG. 3 and by the screw openings in FIG. 5 that are used to join structural section 82 and cover section 84. Wall 92 has an external surface 94 and an internal surface 96. Attachment ends 86 of the arms are pivotally coupled to support block 46 by a pivotable coupling generally referred to by the reference numeral 100. Pivotable coupling 100 pivots on a vertical pivot axis parallel to window 70.

An enlarged view of attachment end 86 and pivotable coupling 100 is illustrated in FIG. 3. Inside surface 96 of wall 92 has a pair of bosses 102 to which is bolted a hinge portion 104 of coupling 100. Shaft 106 passes through hinge portion 104 which may be regarded as a clutch-hinge because frictional resistance tends to hold it in a given pivoted condition. Screws 108 pass through shaft 106 into a pair of vertically separated posts 110, 112 which extend forwardly from support posts 46 through an upper opening 114 and a lower opening 116 in wall 92. Any vertical thrust on shaft 106 is taken by upper and lower bushings 118, 120 which are force fit into upper and lower bushing holders 122, 124 fastened to additional bosses on inside surface 96. Since shaft 106 is fixed to the posts by screws 108, it is clear the pivotal movement occurs by rotation of hinge portion 104 relative to the shaft.

It can be appreciated from FIG. 5 that main part 48 of support block 46 has a pair of vertically spaced posts 110, 112 with an opening 126 between posts 110, 112. As main block 48 has a Y-shaped cross section which may be regarded as a yoke with two arms, it can be appreciated that the corresponding pair of posts 10a and 112a are present laterally spaced opposite posts 110, 112 which are used in the same way to pivotally couple the other arm 20 to the support block.

Returning now to FIG. 2 and FIG. 5, it can be seen that each of the elongated cantilevered arms 20, 22 has an offset support structure 128 located at the outer end portion of each arm which extends away from the arm and is a continuation of wall 96. Offset support structure 128 extends rearwardly and rises upwardly above the upper surface of structural section 82. Offset support structure 128 is further provided with one or more clutch-hinges 130 with screw openings for attachment to a computer monitor, which are pivotable about a horizontal pivot axis. Hinges 130 are bolted to bosses 132 on the inner surface of offset support structure 128. In FIG. 5, clutch-hinges 130 are seen attached to a mounting bracket 134 of a metal panel 136 which forms the backbone of computer monitors 12, 14. The rearward and upward positioning of offset support structure 128 is arranged with respect to a particular computer monitor so that the bottom edge of border 24 is generally aligned right over the middle of a given cantilevered arm 21, 22. Clearance is provided in the back of the monitor so that it won't hit the upper edge of offset support 128.

The pivot points for the cantilevered arms are close together at the attachment ends. This is an important feature which permits the arms and monitors to be pivoted forward or back without creating a large gap between the monitors which is distracting and reduces user efficiency. Two of the assemblies can be used on a desktop arranged to create a "stadium" effect where data intensive users are placed at the center of a semicircle viewing all four monitors. This is often an ideal arrangement for brokerage houses which must have instant access to information continually arriving from many sources. This invention provides the ability to create a stadium effect using flat panel monitors in a convenient space saving arrangement as compared to side by side arrangement of single monitors and does so without annoying gaps between the monitors and easy adjustment. The whole assembly is relatively light in weight and may easily be picked up and carried to a temporary or new location. The pivoting clutch-hinge is sold under the mark Smooth Touch Hing™ by Cemo Technologies, 55 Front St., Bridgeport, Pa. 19405. It allows pivoting movement with little force and stays in the pivoted position.

While a specific embodiment with two monitors has been described and shown, it should be recognized that other modifications and arrangements of the invention can easily be visualized without departing from the spirit and scope of the invention.

We claim:

1. An articulating computer monitor apparatus comprising:
   a base designed to rest on a horizontal surface, the base supporting an upright stand;
   a support block securable along the stand over a range of vertical movement;
   at least one arm pivotally coupled to the support block along a vertical pivot axis by a pivotable coupling;
   a hinged connector mounted on the arm for attachment to a computer monitor wherein the connector is pivotable along a horizontal pivot axis;
   a computer monitor attached to said hinged connector; and
   whereby said computer monitor is supported for movement in three directions.

2. The apparatus of claim 1 wherein said at least one arm is an elongate cantilevered arm having an attachment end pivotally coupled to the support block and an outer end portion.

3. The apparatus of claim 2 wherein the outer end portion of the cantilevered arm has an offset support structure extending away from said arm to which the hinged connector is mounted so that said computer monitor can be generally aligned over the cantilevered arm and tilted backward and forward.

4. The apparatus of claim 3 wherein said cantilevered arm comprises a wall having an external surface and an internal surface with at least one opening at the attachment end which receives a portion of the support block with said pivotable coupling mounted along the internal surface.

5. The apparatus of claim 1 wherein said at least one arm is an elongate cantilevered arm comprising a wall having an external surface and an internal surface and an attachment end having said pivotable coupling which is coupled to said support block.

6. The apparatus of claim 5 wherein said upright stand contains an elongate window in which at least a portion of said support block fits.

7. The apparatus of claim 6 wherein said support block has at least one forwardly extending post and the attachment end has at least one opening which receives said at least one post, said pivotable coupling being attached to the attachment end of the cantilevered arm and to said at least one post.

8. The apparatus of claim 7 wherein said at least one forwardly extending post is a pair of vertically separated posts and said at least one opening is a pair of openings which correspond to the location of said pair of posts.

9. An articulating computer monitor apparatus comprising:
   a base designed to rest on a horizontal surface, the base supporting an upright stand;
   a support block securable over a range of vertical movement at selected positions along the stand, and laterally spaced posts on the support block extending away from the stand;
   a pair of elongate cantilevered arms each comprising a wall having an external surface and an internal surface with an attachment end and an outer end portion, the attachment end of each arm being pivotally coupled by a pivotable coupling to one of the posts extending from the support block for pivoting movement in a generally horizontal direction;
   a pivotable connection mounted from the outer end portion of each cantilevered arm for attachment to a computer monitor which can be tilted backward and forward; and
   whereby a computer monitor can be attached to the pivotable connection of each cantilevered arm and supported for movement in each of three directions.

10. The apparatus of claim 9 further including a pair of computer monitors each attached to one of said pivotable connections extending from the outer portion of the cantilevered arms.

11. The apparatus of claim 9 wherein said base has a portion extending behind said upright stand and spaced apart legs extending forwardly from said stand.

12. The apparatus of claim 11 wherein said legs are spaced apart a distance such that a computer keyboard can be fit into the space between the legs.

13. The apparatus of claim 9 wherein said upright stand contains a vertically elongated window in which at least a portion of said support block fits.

14. The apparatus of claim 13 wherein the upright stand is a hollow section having opposed front and back surfaces connected by spaced apart transverse webs which define shoulders on opposite sides which receive and support the support block on one side and a cap for the support block on the other side.

15. The apparatus of claim 9 wherein the outer end portion of the two cantilevered arms has an offset support structure extending away from said arms to which the pivotable connection is mounted so that said monitors can be generally aligned over the two cantilevered arms and tilted backward and forward.

16. The apparatus of claim 15 wherein the attachment end has openings in the wall that correspond to the location of said posts which pass through said openings, said pivotable couplings at the attachment ends of each cantilevered arm having one pivoting part attached to said wall and another pivotable part attached to said posts.

17. The apparatus of claim 16 wherein said laterally separated posts include a pair of vertically separated posts on each laterally separated post and openings in the wall for each vertically separated post wherein each vertically separated post is connected to some part of a pivotable coupling for an arm.

* * * * *